United States Patent [19]
Valiani

[11] Patent Number: 4,821,377
[45] Date of Patent: Apr. 18, 1989

[54] SAUSAGE-MAKING MACHINE (SAUSAGE-FILLER) FOR SAUSAGES AND OTHER SIMILAR PRODUCTS

[75] Inventor: Bruno Valiani, Siena, Italy

[73] Assignee: Omet S.m.c. di Volentieri & Co., Italy

[21] Appl. No.: 175,928

[22] Filed: Mar. 18, 1988

[30] Foreign Application Priority Data

Mar. 19, 1987 [IT] Italy ................................ 11588/87[U]

[51] Int. Cl.⁴ .............................................. A22C 11/04
[52] U.S. Cl. ................................................ 17/37; 17/38
[58] Field of Search ................................ 17/36, 37, 38

[56] References Cited

U.S. PATENT DOCUMENTS 4,313,240  2/1982  Righele et al. ........................... 17/37

FOREIGN PATENT DOCUMENTS 2058540  4/1981  United Kingdom ................... 17/36

Primary Examiner—Willie G. Abercrombie
Attorney, Agent, or Firm—McGlew & Tuttle

[57] ABSTRACT

A sausage-making machine for pushing a mixture for sausages and other similar products, also produced with relatively fluid filling, comprises: a casing with a hopper-forming lid with a feeder; a rotor; pistons disposed around the rotor axis and movable along directions parallel to the axis of said rotor within through cavities provided in said rotor, said pistons and relevant cavities possibly having a cross-section in the form of circular ring sectors; and between the rotor and the lid, a sealing liner made of self-lubricating synthetic resin, which is retained against rotation and is removable.

4 Claims, 4 Drawing Sheets

SAUSAGE-MAKING MACHINE (SAUSAGE-FILLER) FOR SAUSAGES AND OTHER SIMILAR PRODUCTS

The object of the invention is to provide a sausage-making machine for sausages and other similar products, which comprises: a casing with a lid (or cover) forming a hopper with a feeder; a rotor; pistons located around the rotor axis and movable according to directions parallel to the rotor axis within through cavities provided in said rotor. Said pistons and relevant cavities can have cross-sections in the form of circular ring sectors with almost cylindrical coaxial walls and almost radial walls. The pistons are provided with a shaped channel, in their lower part for their drive, which cooperates with a circumferential cam profile located in the opposite fixed wall for the lowering, while the upwardly directed thrust, i.e. the lifting of said pistons is achieved by a lower thrusting profile. Moreover, the present sausage-making machine comprises a sealing liner or shim, made of self-lubricating synthetic resin, placed between the rotor and the lid. Said liner is retained from rotating and can be removed. Said sealing liner is housed, in practice, within a recess and is made to engage therein against the rotation by appendixes or keys located along its periphery.

The pistons of the sausage-making machine according to the invention may also be provided with annular sealing gaskets for cooperating with the slide seats thereof. Furthermore, an annular gasket may be provided, around the mouth, i.e. the opening, for the entry of the meat mixture through the feeding hopper.

By the above mentioned dispositions, the machine is particularly suitable for operating in perfectly healthy conditions, with the possibility of carrying out an easy maintenance and a periodic cleaning service, and practically, with no significant losses of more fluid food stuff.

BRIEF DESCRIPTION OF THE DRAWINGS

The drawings show a feasible embodiment of the invention and in particular.

DESCRIPTION OF THE PREFERRED EMBODIMENT

Figure 1:
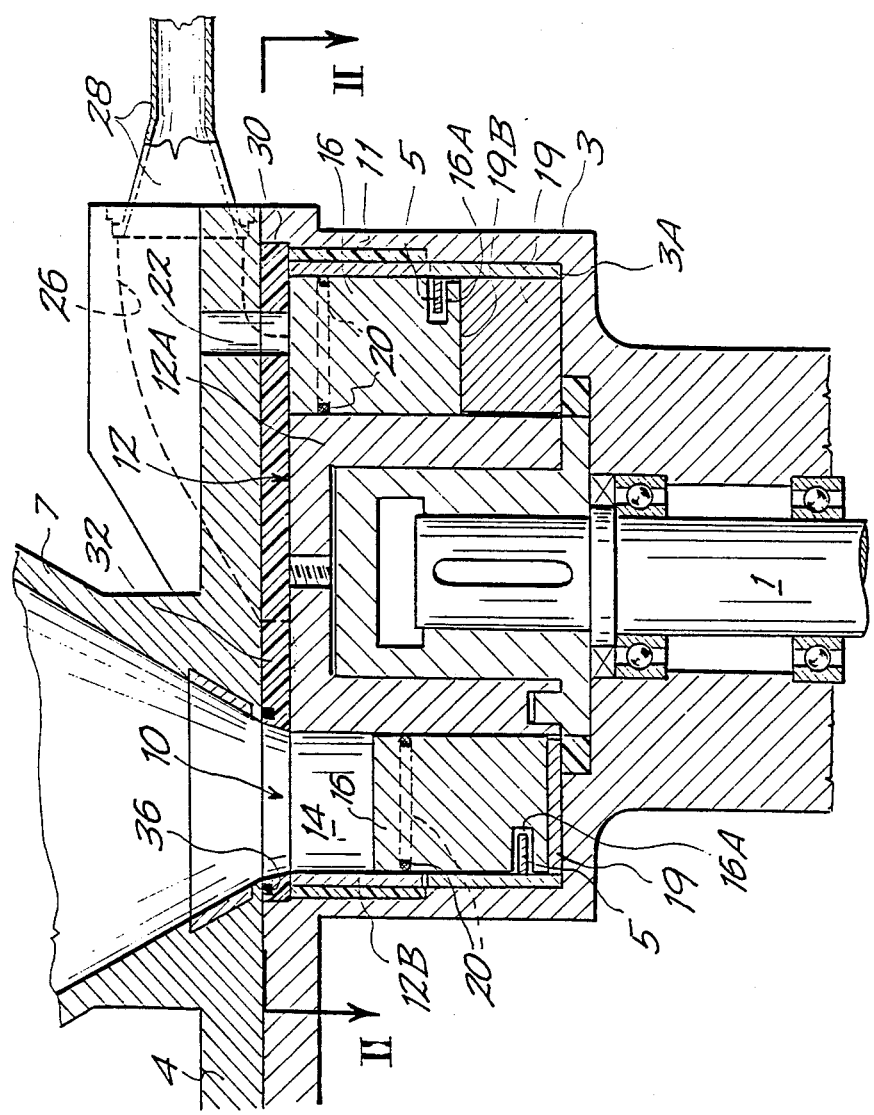
FIG. 1 shows a whole axial section, substantially on line I—I of FIG. 2.
Figure 2:
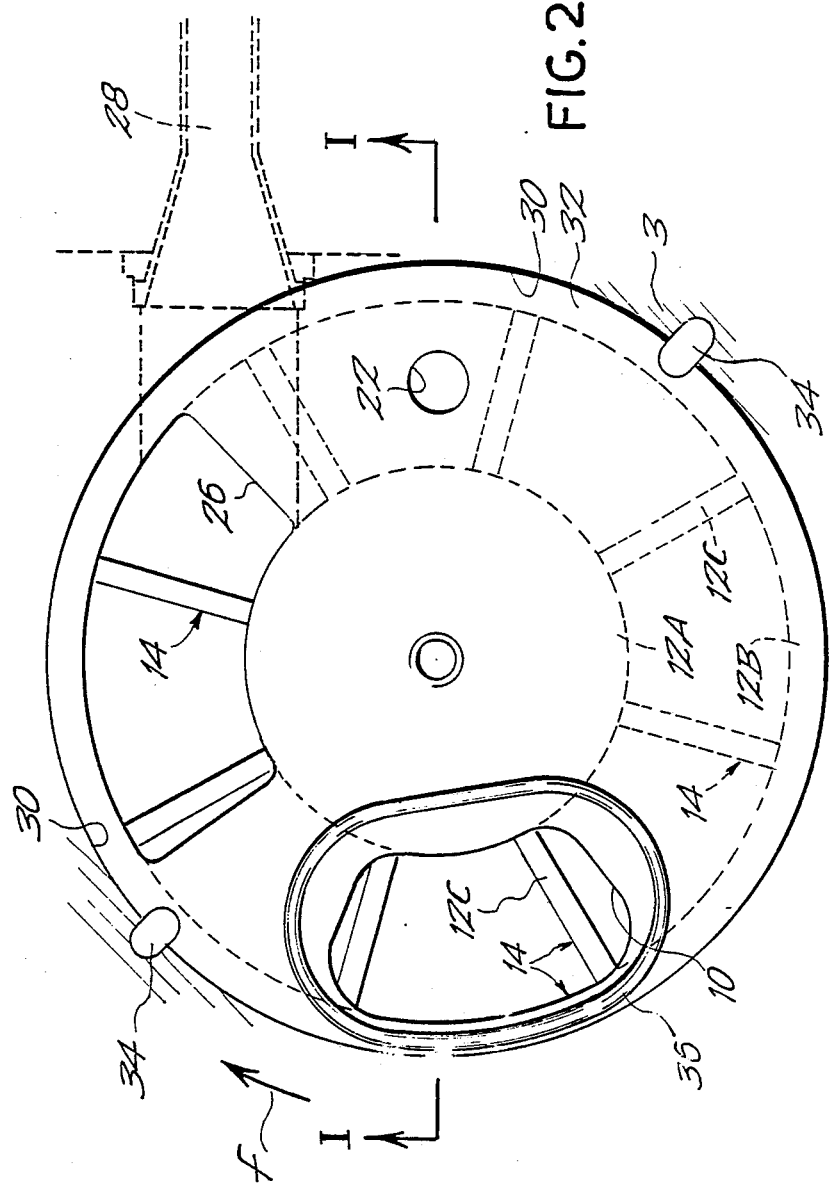
FIG. 2 shows a view substantially on line II—II of FIG. 1.

According to what is illustrated in the attached drawings, numeral 1 indicates the drive shaft of the rotor of a compressor structure (pneumatic pump) for the meat mixture to be made into sausages by means of the sausage-making machine of the invention. Numeral 3 indicates the casing of the compressor structure, and numeral 4 indicates the lid of same casing. Casing 3 has an inserted sheath 3A forming a cam profile 5. A hopper 7 is combined to the lid 4. Said hopper may comprise means for the feeding and thrusting of the mixture, acting as a screw feeder. The hopper 7 is opened in correspondence with a lower mouth, i.e. opening 10 in the lid 4. Inside the casing 3, which is provided with bush 11, a rotor 12 is received, comprising an internal core 12A, a perimetrical skirt 12B of partial height and a set of radial diaphragms 12C, which define through cavities 14. Each of said cavities 14 is thus defined by two substantially radial walls and by two arcuate concentric walls, one of which being convex and the other concave. Inside each of these cavities 14 a corresponding piston 16 is housed, which has a cross-section shape similar to that of cavity 14. Each piston 16 slides within the respective cavity 14 parallel to the rotor axis and is driven by the circumferential cam profile 5, which engages a profile 16A and acts, during the rotation according to arrow f, so as to move the piston downwardly and allows same piston to move up again.

Figure 3:
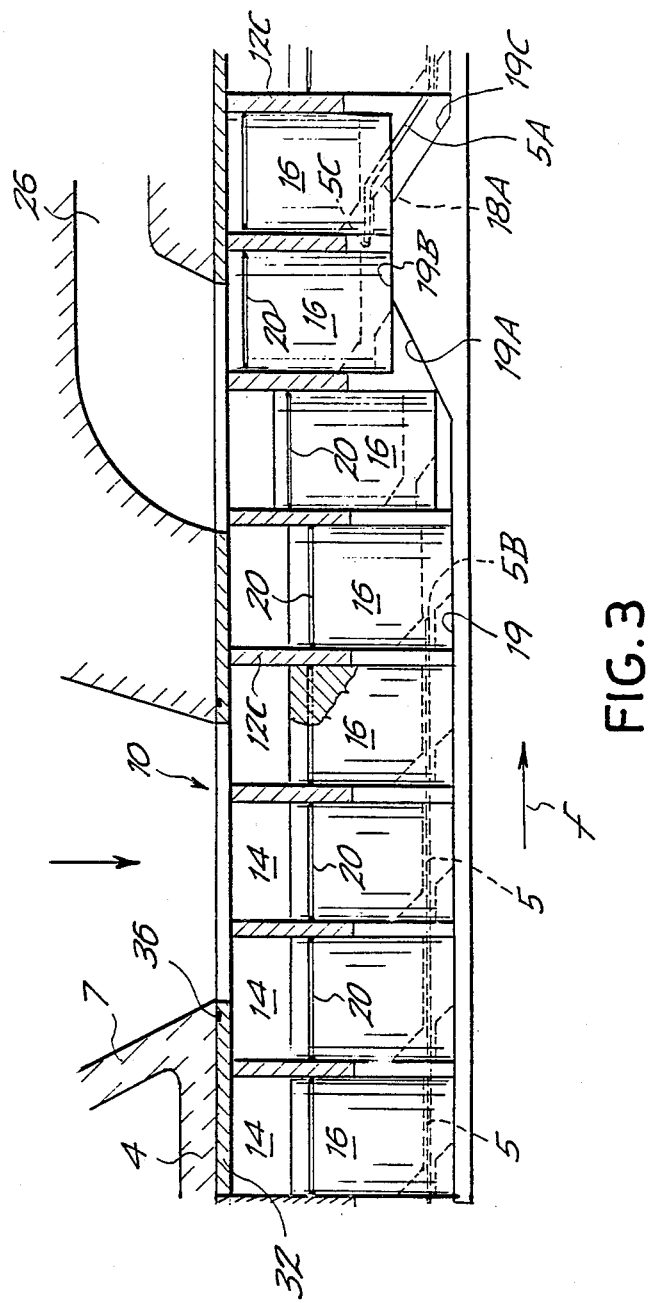
FIG. 3 shows a straight development of the adjacent cavities with relevant pistons and drive cams.
Figure 4:
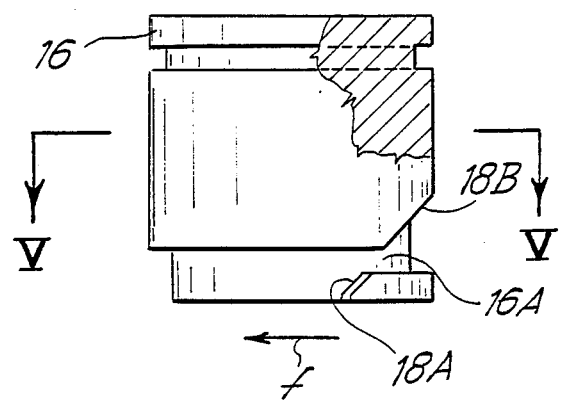
FIGS. 4 and 5 show a piston in side view and in section on line V—V of FIG. 4.
Figure 5:
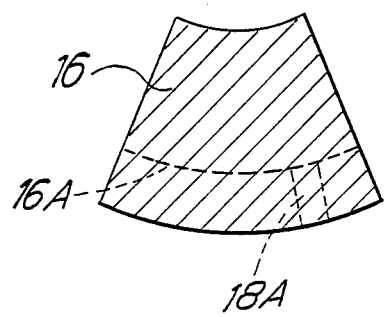

FIG. 3 shows a plan development of the rotor with cavities 14 for the pistons 16. The circumferential cam profile 5 exhibits, over almost its whole development, a flat configuration parallel to the bottom of cavity 14, in order to maintain, along this length, the pistons 16 close to said bottom and, in the upper part, the cavities 14 free for the introduction of the mixture through the opening 10 of hopper 7. Said profile is interrupted at 5B to consent pistons 16 to move up again. To this end, a second cam profile 19 is provided, having a rising slop 19A, a length 19B parallel to the bottom of cavity 14 and a descending length 19C. Said profile 19A, 19B, 19C acts upon the lower portion of each piston 16 by pushing it towards the lid 4 so far as to veil the cavity 14 thereabove for the thrust of the food stuff. The cam profile 5, broken off at 5B, is made to restart from 5C at such a height as to be able to engage with profile 16A of piston 16, which is in the raised position. The profile 5 continues with a descending slope 5A which brings the pistons back to the bottom of the relevant cavities 14. In the length between the end of slope 5A and the interruption point 5B, the cam profile 5 extends parallel to the bottom of cavity 14 and to cam profile 19. The configuration of the engaging profile 16A of cam 5 is clearly shown in FIGS. 4 and 5. It is delimited by a lower surface 18A, in the drawing, on which the descending slope 5A acts, and an upper surface 18B, in the drawing, suitably bevelled to allow the lowering of the piston due to the action on said slope 5A.

The radial portions 12C have a height which is limited to an extent slightly longer than the stroke of pistons 16, in order to allow the action of the cam profile 19.

Between the cavities 14 and the pistons 16, operative annular gaskets 20 are provided, housed within piston channels, for preventing a relatively fluid product from leaking out by blow-by during the thrust phase.

Between the central core 12A of rotor 12, which is coupled to the shaft 1 through a bush, and the lid, channels may be provided extending from cavities 14 up to an orifice 22 for the extraction of air. To the orifice 22 a suitable for suction system may be joined to cause a vaccum inside the cavities 14, with the purpose of drawing out air from the mixture. The whole is predisposed for the elimination of air as required in some working processes.

A discharge opening 26 is provided in the lid 4 in correspondence to the lift length of the cam profile 19. Said discharge opening 26 is connected to a funnel 28 for the making into sausages of the mixture. This mixture is pushed by each piston 16 when this is acted upon by the rising slope.

the casing 3 has a recess 30 in correspondence of the seat for rotor 12. Inside said recess a gasket-sealing liner 32 is housed, which can be made of self-lubricating synthetic resin. Openings 10 and 26 of said sealing liner 32 correspond to those of lid 4, and a passage corresponds to hole 22. The liner 32 is retained against rotation by key elments 34 received into notches of seat 30 and of liner 32. It may also be possible that retaining appendixes are formed integral with liner 32. The liner 32 is easily removable for cleaning service and replaceable, and does not provide any receptacle in which the food stuff under work might become stagnant, and it provides a seal between the lid 4 and the rotor 12. A sealing gasekt 36 is located around the opening 10, between the lid 4 and the liner 32.

A vacuum is generated inside the cavity 14 during the rotation and the action of profile 5. Said vacuum facilitates the entry of the mixture through the opening 10 into the cavity 14 above pistons 16. However, the mixture fills the cavity 14 owing also, and also all, to the effect of the screw feeding means 9 within hopper 7, along the path over which the pistons 16 are lowered. The gasket 36 prevents leakage of food stuff. The mixture is then pushed through the opening 26 and funnel 28, by the pistons 16 going up again through the action of the cam profile 19. The gaskets 20 avoid blow-by and losses between the pistons 16 and the seats 14 for said gaskets.

The air extraction channels, joined to the hole 22, may be formed in the liner 32 at the coupling surface with the rotor 12. By replacing liner 32 it is possible to eliminate the air intake system. Alternatively, air channels may be provided between the liner 32 and the lid 4.

The described embodiment is suitable for a hygienic working of relatively fluid products but is also suitable for working products in more dense pieces. In any case, stagnations incompatible with hygienic work conditions as well as too frequent interventions for the cleaning of the machine, are avoided.

I claim:

1. A sausage-making machine for pushing a mixture for sausages and other similar products, also produced with relatively fluid filling, comprising: a casing with a lid forming a hopper with a feeder; a rotor having through cavities; pistons located around the rotor axis and movable parallel to the axis of said rotor within said through cavities provided in said rotor; between the rotor and said lid, a sealing liner made of self-lubricating synthetic resin, which is retained against rotation and is removable; and cam profiles for the lifting and the lowering of the pistons inside the relevant cavities.

2. Sausage-making machine according to claim 1 wherein said pistons and relevant cavities therefore have their cross-sections in the form of circular ring sectors.

3. Sausage-making machine according to claim 1, wherein said sealing liner is housed inside a recess of said casing and is engaged therein against rotation by appendixes or keys along the periphery.

4. Sausage-making machine according to claim 1, further comprising annular sealing gaskets on the pistons, cooperating with the slide seats thereof, and an annular gasket around the opening for the introduction of the mixture through the feeding hopper.

* * * * *